Figures 1, 2:
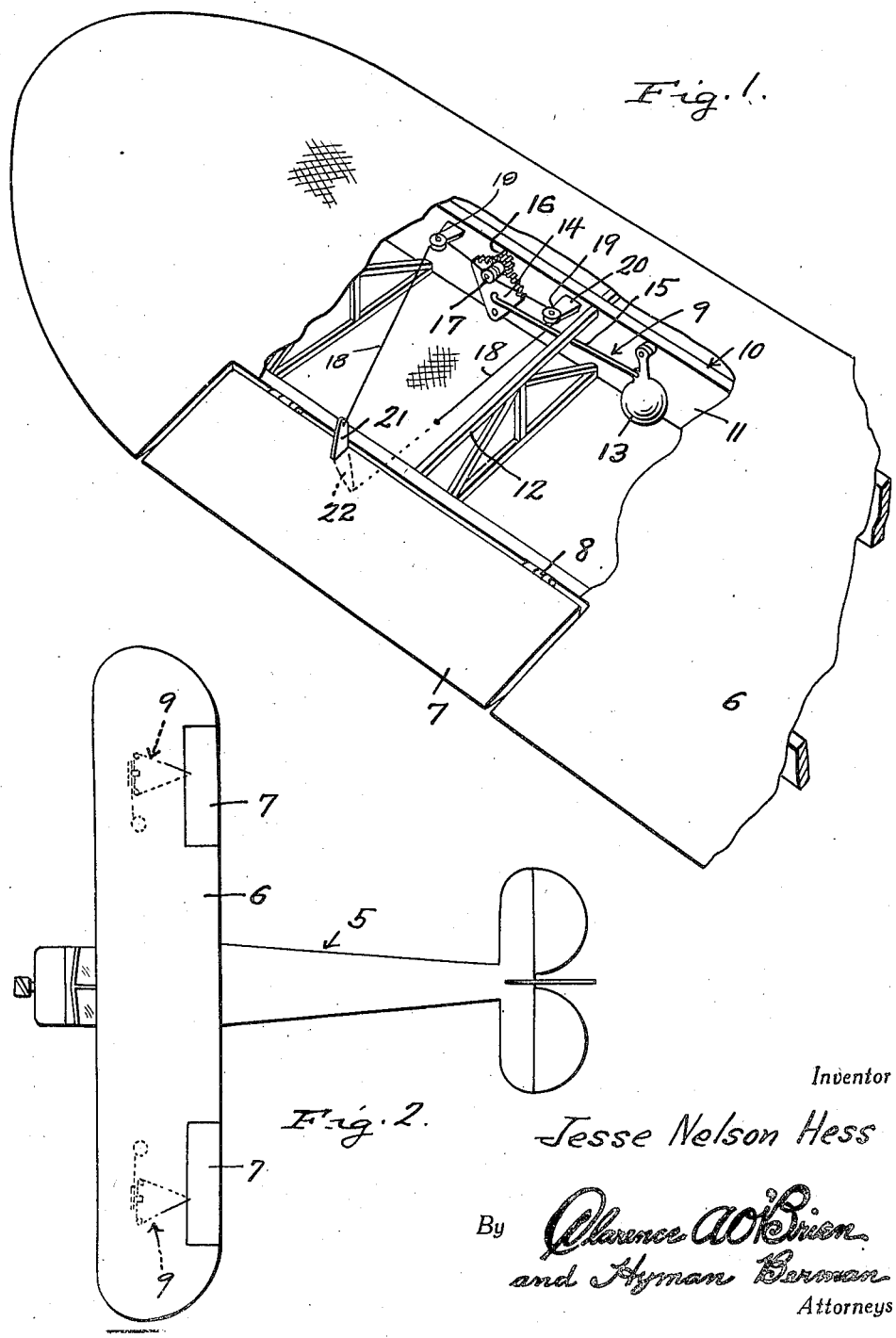

Aug. 13, 1940.        J. N. HESS        2,211,267
AIRPLANE CONTROL
Filed Sept. 7, 1939

Inventor
Jesse Nelson Hess

By Clarence A. O'Brien
and Hyman Berman
Attorneys

Patented Aug. 13, 1940

2,211,267

UNITED STATES PATENT OFFICE 2,211,267

AIRPLANE CONTROL

Jesse N. Hess, Pampa, Tex.

Application September 7, 1939, Serial No. 293,821

1 Claim. (Cl. 244—80)

This invention relates to airplane controls, and has for the primary object the provision of means which may be easily adapted to an airplane and connected to the ailerons thereof for automatically actuating the latter to stabilize the airplane when encountering rough flying conditions tending to cause the airplane to tip from side to side.

With these and other objects in view, the invention consists in certain novel features of construction, combination and arrangement of parts to be hereinafter more fully described and claimed.

For a complete understanding of my invention, reference is to be had to the following description and accompanying drawing, in which Figure 1 is a fragmentary perspective view, partly in section, and broken away to shown an aileron control mounted thereon and constructed in accordance with the present invention.

Figure 2 is a top plan view illustrating an airplane with the present invention installed on the wings thereof.

Referring in detail to the drawing, the numeral 5 indicates a conventional construction of an airplane, the wings thereof being indicated by the character 6 and are equipped with ailerons 7 hinged to the wings, as shown at 8. An airplane when encountering rough flying conditions has a tendency to suddenly tip from side to side and frequently if not stabilized will get out of control and enter a spin endangering the airplane and its occupants. To counteract these dangers and to automatically stabilize the airplane under these flying conditions controls 9 are adapted to the wings as clearly shown in Figure 2 and operatively connected to the ailerons. As the controls are identical in construction, a detail description will be hereinafter given of one of said controls which will be applicable to both of the controls.

The frame construction of the wing is indicated by the character 10 and includes longitudinally extending members 11 and transverse members 12. The control is shown as mounted on one of the longitudinally extending members 11 and consists of a pivotally mounted weight 13 connected to a pivotally mounted segmental gear 14 by a connecting link 15. The gear 14 is pivotally mounted on the member 11 of the frame and the link 15 has pivotal connection with the weight 13 as well as with the gear 14. A shaft having a gear 16 is journalled on the member 11 with the gear in mesh with the segmental gear 14. The shaft further includes a drum 17 on which is wound a cable 18. The cable feeds off of the drum in opposite directions and passes over pulleys 19 supported by brackets 20 mounted on the member 11 of the frame. One end of the cable is connected to an upstanding arm 21 secured on the aileron 7 while the other end of the cable is connected to a depending arm 22 secured on the aileron. When the wing is in a horizontal position the aileron is maintained in a plane with the plane of the wing by the weight 13. However, when the wing tips, the weight swings in the direction of the lowering of the wing and brings about movement of the aileron out of the plane of the wing to counteract the tipping of the wing and thereby bring about stabilizing of the airplane when encountering rough flying condition.

The control as shown in the drawing and described in detail consists of a minimum number of parts and may be readily installed on the frame of a wing within the walls of the wing and will effectively stabilize an airplane under the most severe flying conditions.

It is believed that the foregoing description, when taken in connection with the drawing will fully set forth the construction and advantages of the invention to those skilled in the art to which such a device relates, so that further detailed description will not be required.

Having thus described the invention, what I claim is:

In combination with an airplane wing including a frame construction and upper and lower wall construction for said frame and defining a closed space within the wing, an aileron hinged on said wing and having oppositely extending arms, a shaft journaled in the frame within said closed space, a drum secured on said shaft, pulleys mounted on said frame at opposite sides of the shaft, a flexible element secured to and wound on said drum and extending in opposite directions therefrom and passing over the pulleys and secured to said arms, a gear secured on said shaft, a segmental shaped gear pivoted on said frame and meshing with the first gear, a connecting rod pivoted to said second gear, and a weight pivoted on the frame and located entirely within the closed space of the wing and having said connecting rod pivoted thereto.

JESSE N. HESS.